(12) United States Patent
Nassar et al.

(10) Patent No.: US 7,293,465 B2
(45) Date of Patent: *Nov. 13, 2007

(54) CONVEYOR DIAGNOSTIC SYSTEM HAVING LOCAL POSITIONING SYSTEM

(75) Inventors: Sayed Nassar, Northville, MI (US); Gerry Grzadzinski, Sterling Heights, MI (US); Sherif Gindy, Macomb, MI (US)

(73) Assignee: Chrysler LLC, Auburn Hills, MI (US)

( * ) Notice: Subject to any disclaimer, the term of this patent is extended or adjusted under 35 U.S.C. 154(b) by 187 days.

This patent is subject to a terminal disclaimer.

(21) Appl. No.: 11/221,625

(22) Filed: Sep. 9, 2005

(65) Prior Publication Data

US 2007/0056379 A1 Mar. 15, 2007

(51) Int. Cl.
*G01B 7/16* (2006.01)
(52) U.S. Cl. .......................................... 73/774
(58) Field of Classification Search .................. 73/774, 73/828, 862.391, 862.392, 862.451, 784; 198/867.01, 349.95, 708; 702/97; 177/119
See application file for complete search history.

(56) References Cited

U.S. PATENT DOCUMENTS

| 5,207,108 A | 5/1993 | Tassic |
| 5,287,756 A | 2/1994 | Tassic |
| 6,865,955 B2 * | 3/2005 | Nassar et al. .................. 73/828 |

* cited by examiner

*Primary Examiner*—Jewel Thompson
(74) *Attorney, Agent, or Firm*—Ralph E. Smith

(57) ABSTRACT

A conveyor diagnostic system for monitoring loading of a conveyor line assembly including at least one sensor component coupled to the conveyor line assembly. The sensor component is adapted for detecting loading of the conveyor line assembly and is further adapted for generating and transmitting a signal that is correlative of the loading of the conveyor line assembly. The conveyor diagnostic system also includes a ground station adapted to receive and process the signal that is correlative of the loading of the conveyor line assembly. Furthermore, the conveyor diagnostic system includes a local positioning system that is adapted for detecting the location of the sensor component in relation to a reference point. A method of using the conveyor diagnostic system is also disclosed.

20 Claims, 2 Drawing Sheets

CONVEYOR DIAGNOSTIC SYSTEM HAVING LOCAL POSITIONING SYSTEM

FIELD OF THE INVENTION

The present invention relates generally to a conveyor diagnostic system and, more specifically, to a conveyor diagnostic system having a local positioning system.

BACKGROUND OF THE INVENTION

Most conveyor line assemblies include moving parts, such as chains, rollers, and the like that undergo a significant amount of loading during operation. These loads may vary over time or may be concentrated in certain areas of the conveyor line assembly. For instance, loads on the conveyor line assembly can increase over the operating life of the assembly. Likewise, load concentrations can develop due to structural misalignment, wear, or lack of proper lubrication of certain components of the conveyor line assembly. Such loading can cause the conveyor line assembly to malfunction or fail, which can lead to losses in productivity.

Conveyor diagnostic systems have been designed for measuring and monitoring these loads. Typical systems measure loading by using strain gauges that are coupled to chain links of the conveyor line assembly. The loads are monitored to thereby properly maintain and preferably avoid failure of the conveyor.

However, conventional conveyor diagnostic systems do not allow the user to directly identify where the measured loads occur on the conveyor line assembly. Thus, although the user is able to identify the degree of loading on the conveyor, the user will likely not be able to identify which specific components need maintenance or replacement to reduce the loading. Accordingly, there remains a need for a conveyor diagnostic system that can effectively detect loading of a conveyor line assembly and that can locate where certain loads occur.

SUMMARY OF THE INVENTION

The present invention overcomes the disadvantages of the related art in a conveyor diagnostic system for monitoring loading of a conveyor line assembly. The conveyor diagnostic system includes at least one sensor component coupled to the conveyor line assembly. The sensor component is adapted for detecting loading of the conveyor line assembly and is further adapted for generating and transmitting a signal that is correlative of the loading of the conveyor line assembly. The conveyor diagnostic system also includes a ground station adapted to receive and process the signal that is correlative of the loading of the conveyor line assembly. Furthermore, the conveyor diagnostic system includes a local positioning system that is adapted for detecting the location of the sensor component in relation to a reference point.

In another aspect, the present invention is a method of monitoring a conveyor line assembly that involves detecting loading of the conveyor line assembly using at least one sensor component coupled to the conveyor line assembly. The method also involves generating a signal that correlates to the loading of the conveyor line assembly. Furthermore, the method involves processing the signal that correlates to the loading of the conveyor line assembly. In addition, the method involves locating the at least one sensor component in relation to a reference point to thereby analyze an identified portion of the conveyor line assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
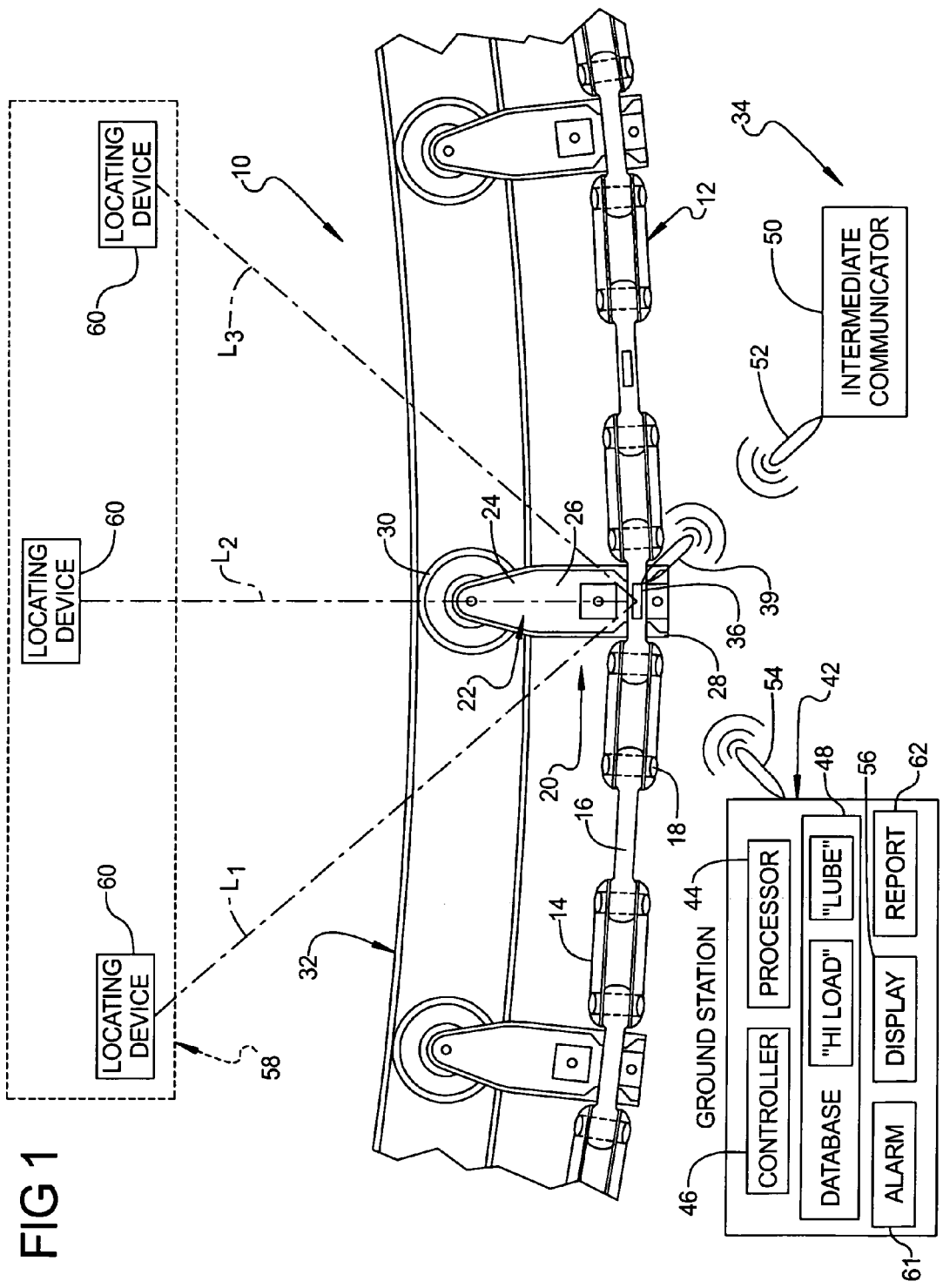
FIG. 1 is a schematic illustration of a portion of a conveyor line assembly with a conveyor diagnostic system of the present invention.

Referring to the drawings and in particular FIG. 1, one embodiment of a portion of a conveyor line assembly 10 is generally illustrated. As shown, the conveyor line assembly 10 includes a conveyor chain 12 having at least one—and preferably a plurality—of chain links. For instance, in the embodiment shown, the conveyor chain 12 includes a plurality of dual links 14 and a plurality of single links 16 coupled in alternating manner by pins 18. The conveyor line assembly 10 also includes a carrier assembly 20 for movably supporting the chain 12. The carrier assembly 20 includes trolleys 22 having an upper portion 24, an intermediate portion 26, and a lower portion 28. The upper portion 24 of each trolley 22 is pivotally coupled to a roller 30, and the roller 30 is rotationally supported by a beam 32. The intermediate portion 26 of each trolley 22 is coupled in any suitable manner to one of the single links 16 of the conveyor chain 12. The lower portion 28 of each trolley 22 can be used to support an article for moving the article along an assembly line.

As shown in FIG. 1, the conveyor line assembly 10 also includes a conveyor diagnostic system 34 for monitoring loading of the conveyor line assembly 10. The conveyor diagnostic system 34 includes at least one sensor component 36 shown in detail in FIG. 2. In the embodiment shown, the sensor component 36 is coupled to one of the single links 16 of the conveyor chain 12 and can detect loading of the corresponding single link 16. However, those having ordinary skill in the art will appreciate that the sensor component 36 could be coupled anywhere along the conveyor chain 12 or to any other suitable component of the conveyor line assembly 10 without departing from the scope of the present invention. It should also be appreciated that the conveyor diagnostic system 34 could include a plurality of sensor components 36, each coupled to individual links 16, without departing from the scope of the invention.

Figure 2:
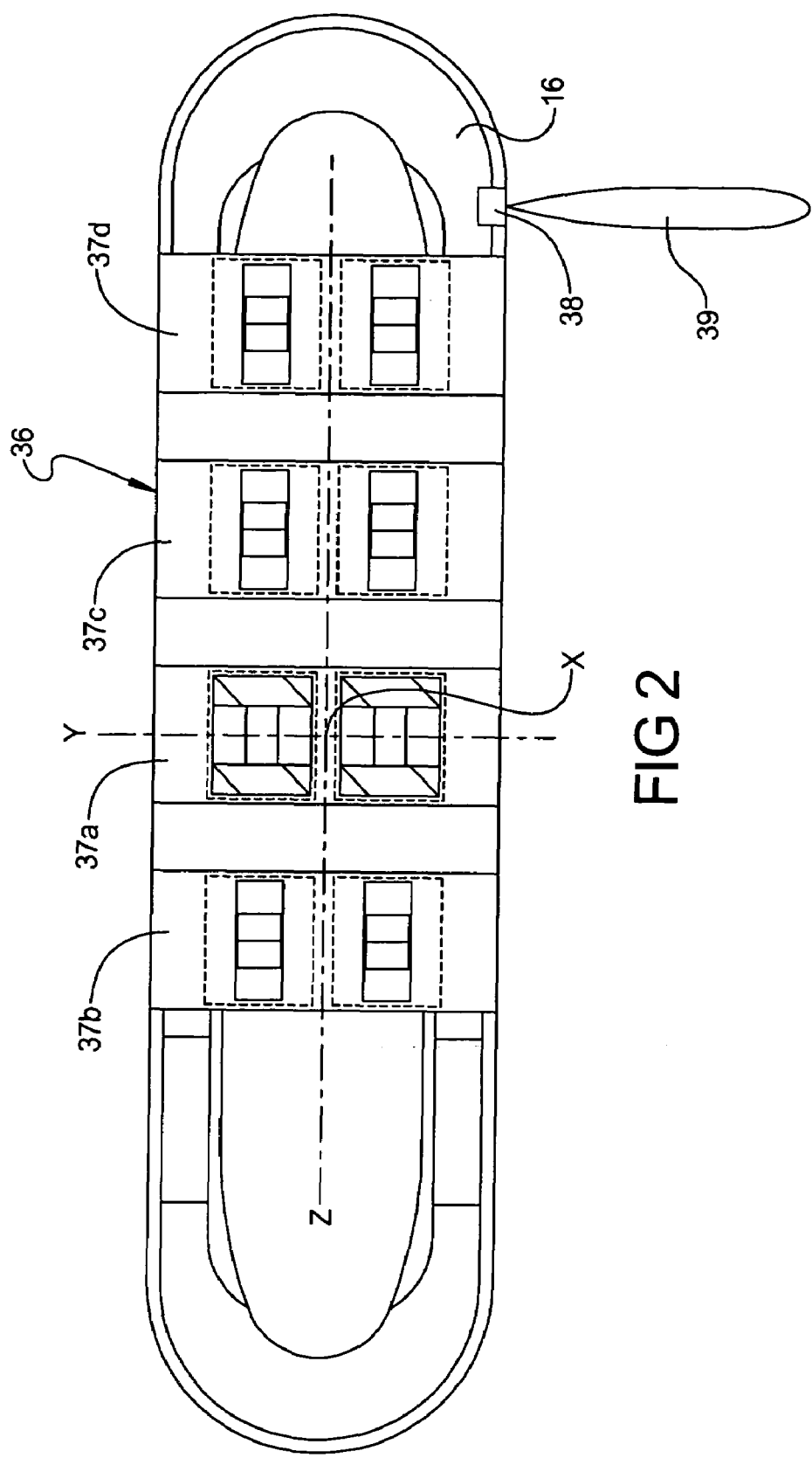
FIG. 2 is a top view of a chain link of a conveyor chain having a sensor array for measuring loading of the chain link.

As shown in FIG. 2, the sensor component 36 is disposed inside the single link 16 for detecting loading of that link 16 as it moves along the conveyor line assembly 10. In one embodiment, the sensor component 36 is of a type disclosed in Applicant's U.S. Pat. No. 6,865,955, which is hereby incorporated by reference in its entirety. The sensor component 36 includes a plurality of sub-structures 37a, 37b, 37c, 37d mounted to the link 16 and includes a circuit having a plurality of strain gauges wired into a Wheatstone Bridge. The plurality of strain gauges generates a signal that correlates to the loading of the link 16. More specifically, mechanical loading of the link 16 causes resistance changes in the strain gauges such that an electrical signal is generated.

Furthermore, in one embodiment, the sensor component 36 is adapted for detecting multiple loading types including tension, bending, and torsion loads in the link 16. Also, the sensor component 36 can detect multi-axial loading in the link 16. More specifically, as shown in FIG. 2, the link 16 defines three axes (labeled X, Y, and Z), and the sensor component 36 can detect axial loads along any of these axes, bending loads about any of these axes, and/or torsion loads about any of these axes.

For instance, in the embodiment shown in FIG. 2, the strain gauges of the sub-structure 37a are oriented to primarily detect tension loading along the Z axis, the strain gauges of the substructure 37b are oriented to primarily detect bending loads about the X axis, the strain gauges of the substructure 37c are oriented to primarily detect bending loads about the Y axis, and the strain gauges of the sub-structure 37d are orientated primarily detect bending (torsional) loads about the Z axis. The strain gauges for each substructure 37a, 37b, 37c, 37d are oriented to be sensitive enough in the direction of the load component it is measuring and stiff enough in all other directions to minimize the influence on the overall stiffness of link 16. In one embodiment, the sensor component 36 also compensates for temperature effects as well as cancellation of signals caused by extraneous loading such as the other loads measured by the other substructures 37a, 37b, 37c, 37d. Accordingly, the sensor component 36 can detect and measure the loading of the link 16 more precisely for improved analysis of the loading on the conveyor line assembly 10 as will be discussed in greater detail below. It should be appreciated that the link 16 can include any number of substructures 37a, 37b, 37c, 37d and that the substructures can be oriented to detect any type of load with respect to any axis depending on the application of the conveyor diagnostic system 34.

The sensor component 36 is also adapted for transmitting the signal that correlates to the detected loading of the link 16. For these purposes, the sensor component 36 is electrically connected to a transceiver 38 with a sensor antenna 39 that transmits and receives RF signals. The transceiver 38 transmits signals that correlate to the loading of the link 16 and also receives command signals that affect the operation of the sensor component 36 as will be discussed in greater detail below.

As shown in FIG. 1, the conveyor diagnostic system 34 further includes a ground station 42 that generally receives and processes the signals generated and transmitted by the sensor component 36. In the embodiment shown, the ground station 42 includes a processor 44, a controller 46, and a database 48. Generally speaking, the controller 46 generates control signals that control the operation of the conveyor diagnostic system 34, the processor 44 processes data supplied by the sensor component 36, and the database 48 provides information regarding the conveyor line assembly 10 to a user based on the processed data. The processor 44, controller 46, and database 48 can be electrically connected in any suitable manner. For instance, in one embodiment, the processor 44, controller 46, and database 48 are included in a computer.

The conveyor diagnostic system 34 also includes an intermediate communicator 50. The intermediate communicator 50 receives the RF signals from the sensor component 36 and in turn transmits correlative signals to the ground station 42. For these purposes, the intermediate communicator 50 includes appropriate circuitry and an intermediate antenna 52. Likewise, the ground station 42 includes appropriate circuitry and a ground antenna 54. RF signals transmitted from the sensor antenna 39 are received by the intermediate antenna 52 of the intermediate communicator 50, which in turn transmits correlative RF signals to the ground station 42 via the intermediate antenna 52. Those signals are received by the ground station 42 via the ground antenna 54. As such, the sensor component 36, the intermediate communicator 50, and the ground station 42 can each be disposed remotely from each other and yet those components can still effectively communicate. This can be especially advantageous in situations where the link 16, and thus the sensor component 36, moves a relatively far distance away from the ground station 42.

It should be appreciated, however, that the sensor component 36 could directly communicate with the ground station 42 without an intermediate communicator 50 without departing from the scope of the invention. It should also be appreciated that the sensor component 36, the intermediate communicator 50, and the ground station 42 could be directly wired together without departing from the scope of the present invention. Furthermore, it should be appreciated that the intercommunication between the sensor component 36, the intermediate communicator 50, and the ground station 42 could occur via any suitable signal transmission means other than RF transmission without departing from the scope of the invention.

The conveyor diagnostic system 34 also includes a local positioning system (LPS) 58 adapted for detecting the location of the sensor component 36 in relation to a reference point. In one embodiment, the LPS 58 includes a plurality of remote locating devices 60 that are disposed in spaced relationship to each other as shown in FIG. 1. The remote locating devices 60 can be disposed in any suitable location, such as in various spaced locations in a manufacturing plant. The LPS 58 is adapted to detect the distance between the sensor component 36 and the remote locating devices 60 to thereby locate the sensor component 36. The remote locating devices 60 can be of any suitable type suitable for detecting the distance to the sensor component 36. In one embodiment, the LPS 58 detects the distance between the sensor component 36 and a maximum of three separate remote locating devices 60. These distances are represented by lines $L_1$, $L_2$, and $L_3$ in FIG. 1. The distances $L_1$, $L_2$, and $L_3$ are communicated to the processor 44 of the ground station 42, which employs known triangulation methods to locate the sensor component 36 in one embodiment. The reference point used to locate the sensor component 36 can be anywhere that is suitable, and in one embodiment, the LPS 58 locates the sensor component 36 with enough precision to determine an area of the conveyor line assembly 10 where the sensor component 36 is located in relation to the rest of the conveyor line assembly 10. Accordingly, the conveyor diagnostic system 34 can associate particular loads experienced by a particular link 16 with particular areas of the conveyor line assembly 10. As such, the user can analyze and monitor the conveyor line assembly 16 with more precision, and the user can correct problematic areas of the conveyor line assembly 10 more efficiently.

The LPS 58 can include at least one existing sensor, such as the HX5 Series sensors from Hexamite, the PAL 650 from Multispectral Solutions, Inc., the HF, LPS, or LPS007 from SYP Tech. Corp., the UWB from UBI Sense, the RFID from Pin Point, or a combination of these and other technologies. It should also be appreciated that RF sensors and known triangulation methods could be utilized by the LPS 58. Radar, magnetic, and/or optical sensors could also be used without departing from the scope of the invention. Also, especially in cases where the conveyor line assembly 10 is well established, a mathematical three-dimensional equation of the conveyor line assembly 10 can be generated which, together with one or more locus points (i.e., $L_1$, $L_2$, $L_3$ of FIG. 1) detected by the LPS 58, can be used to locate the sensor component 36.

In operation, the conveyor chain 12 moves along the conveyor line assembly 10. As the link 16 moves with the chain 12, the sensor component 36 in the link 16 detects the load experienced by the link 36 and transmits an RF signal correlative of the loading to the intermediate communicator 50. The intermediate communicator 50 in turn transmits a correlative RF signal to the ground station 42, and the processor 44 processes data based on those signals using any suitable mathematical model. The database 48 is accessed and used to identify a condition of the conveyor line assembly 10 based on the signals received from the sensor component 36. For instance, if a high degree of loading is detected as represented in FIG. 1, the database 48 is accessed to identify possible conditions that might cause such loads, such as insufficient lubrication, or the like. In one embodiment, the database 48 also includes associated courses of action that could be taken under such conditions. Using the previous example, the database 48 might indicate that lubrication is needed or that parts should be replaced in order to reduce the loads.

In one embodiment, the ground station 42 also includes a display 56 that communicates the status of the conveyor line assembly 10 and any appropriate course of action to the user. The status of the conveyor line assembly 10 can be displayed in any suitable manner, such as with graphs, prepared textual messages, and the like. In the embodiment shown, the conveyor diagnostic system 34 also includes an alarm system 61 that can alert a user as to potential problems in the conveyor line assembly 10. The conveyor diagnostic system 34 also includes a reporting system 62 that generates electronic reports and/or hard copies of reports of the condition of the conveyor line assembly 10.

In one embodiment, the processor 44 processes the data in real time such that users can monitor the condition of the conveyor line assembly 10 substantially as the loads occur. As such, problems with the conveyor line assembly 10 can be corrected more quickly, and problems can be predicted and avoided.

In one embodiment, the controller 46 also causes the ground station 42 to transmit control signals to the sensor component 36. For instance, in one embodiment, the control signals cause the sensor component 36 to start detecting the load on the link 16 and other control signals cause the sensor component 36 to stop detecting the load. It should be appreciated that the control signals sent by the ground station 42 to the sensor component 36 could cause the sensor component 36 to operate in any predetermined fashion without departing from the scope of the invention.

The conveyor diagnostic system 34 could also be used to analyze conditions that caused a previous failure of the conveyor line assembly 10. In addition, the conveyor diagnostic system 34 could be used in association with a plurality of similar conveyor line assemblies 10 to compare the conditions of each. For instance, if loading in a certain area of one of the conveyor line assemblies 10 is significantly greater than the corresponding area of another conveyor line assembly 10, users will likely be aware of a potential problem. The conveyor diagnostic system 34 could be further used when a conveyor line assembly 10 is first used to determine baseline conditions, and then the system 34 can be used to compare those baseline conditions to the condition of the conveyor line assembly 10 as it is used. The conditions detected using the conveyor diagnostic system 34 can be used to monitor existing conveyor line assemblies 10 and/or for designing better conveyor line assemblies 10 in the future. For instance, data obtained by the conveyor diagnostic system 34 can be used to develop mathematical relationships between load conditions and the location of the sensor component 36, the drive motor parameters, the articles moved by the conveyor chain, and the like for designing better conveyor line assemblies 10.

Also, in one embodiment, the conveyor diagnostic system 34 is adapted to automatically operate the conveyor line assembly 10 based on the loads detected by the sensor component 36. For instance, if the sensor component 36 detects loading at levels beyond a predetermined threshold, the controller 46 could be programmed to cause the conveyor chain 12 to stop moving to thereby avoid damage to the conveyor line assembly 10.

In summary, the conveyor diagnostic system 34 allows for more precise monitoring of the conveyor line assembly 10 by providing important information about the load conditions of the conveyor line assembly 10. The conveyor diagnostic system 34 also locates areas where particular loading occurs. As such, users can more easily determine problems associated with the conveyor line assembly 10 and avoid damage or failure of the conveyor line assembly 10. In addition, users can more easily design and build conveyor line assemblies 10 that have improved operating characteristics.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A conveyor diagnostic system for monitoring loading of a conveyor line assembly comprising:
    at least one sensor component coupled to the conveyor line assembly and adapted for detecting loading of the conveyor line assembly and further adapted for generating and transmitting a signal correlative of the loading of the conveyor line assembly;
    a ground station adapted to receive and process the signal correlative of the loading of the conveyor line assembly; and
    a local positioning system adapted for detecting a location of said at least one sensor component in relation to a reference point.

2. The conveyor diagnostic system as set forth in claim 1, wherein said local positioning system comprises a plurality of remote locating devices disposed in spaced relationship to each other, and wherein said local positioning system is adapted to detect the distance between said at least one sensor component and said plurality of remote locating devices to thereby detect the location of said at least one sensor component.

3. The conveyor diagnostic system as set forth in claim 1, further comprising at least one intermediate communicator adapted for receiving the signal from said at least one sensor component and transmitting a signal correlative of the loading of the conveyor line assembly to said ground station.

4. The conveyor diagnostic system as set forth in claim 1, wherein said at least one sensor component is adapted for detecting at least two loading types chosen from a group consisting of tension, bending, and torsion loads of the conveyor line assembly.

5. The conveyor diagnostic system as set forth in claim 1, wherein said conveyor line assembly defines a plurality of axes, and said at least one sensor component is adapted for detecting loading in relation to at least two of said plurality of axes.

6. The conveyor diagnostic system as set forth in claim 1, wherein the conveyor line assembly comprises at least one chain link, said at least one sensor component is coupled to the at least one chain link, and said at least one sensor component is adapted for detecting loading of the at least one chain link.

7. The conveyor diagnostic system as set forth in claim 1, wherein the ground station comprises a database used to identify a condition of the conveyor line assembly based on the signal correlative of the loading of the conveyor line assembly.

8. The conveyor diagnostic system as set forth in claim 1, further comprising a controller, wherein said at least one sensor component includes a transceiver adapted for transmitting the signal correlative of the loading of the conveyor line assembly and further adapted for receiving command signals from said controller affecting the operation of said at least one sensor component.

9. A method of monitoring a conveyor line assembly comprising the steps of:
   detecting loading of the conveyor line assembly using at least one sensor component coupled to the conveyor line assembly;
   generating a signal that correlates to the loading of the conveyor line assembly;
   processing the signal that correlates to the loading of the conveyor line assembly; and
   locating the at least one sensor component in relation to a reference point to thereby analyze an identified portion of the conveyor line assembly.

10. The method as set forth in claim 9, wherein said step of locating the at least one sensor component in relation to a reference point comprises detecting the distance between the at least one sensor component and a plurality of remote locating devices that are disposed in spaced relationship to each other.

11. The method as set forth in claim 9, wherein said step of detecting loading of the conveyor line assembly using the at least one sensor component comprises detecting at least two loading types chosen from a group consisting of tension, bending, and torsion loads of the conveyor line assembly.

12. The method as set forth in claim 9, wherein the conveyor line assembly defines a plurality of axes, and wherein said step of detecting loading of the conveyor line assembly comprises detecting loading in relation to at least two of the plurality of axes.

13. The method as set forth in claim 9, wherein the conveyor line assembly comprises at least one chain link, and further comprising the step of coupling the at least one sensor component to the at least one chain link, and wherein said step of detecting loading of the conveyor line assembly using the at least one sensor component comprises detecting loading of the at least one chain link.

14. The method as set forth in claim 9, further comprising the step of identifying a condition of the conveyor line assembly based on the signal that correlates to the loading of the conveyor line assembly.

15. The method as set forth in claim 14, further comprising the step of identifying a course of action for the conveyor line assembly based on the condition of the conveyor line assembly.

16. A conveyor line assembly comprising:
   at least one chain link;
   at least one sensor component coupled to said at least one chain link and adapted for detecting loading of said at least one chain link and further adapted for generating and transmitting a signal correlative of the loading of said at least one chain link;
   a ground station adapted to receive and process the signal correlative of the loading of said at least one chain link; and
   a local positioning system adapted for detecting a location of said at least one sensor component in relation to a reference point.

17. The conveyor line assembly as set forth in claim 16, wherein said local positioning system comprises a plurality of remote locating devices disposed in spaced relationship to each other, and wherein said local positioning system is adapted to detect the distance between said at least one sensor component and said plurality of remote locating devices to thereby detect the location of said at least one sensor component.

18. The conveyor diagnostic system as set forth in claim 16, further comprising at least one intermediate communicator adapted for receiving the signal from said at least one sensor component and transmitting a signal correlative of the loading of the conveyor line assembly to said ground station.

19. The conveyor line assembly as set forth in claim 16, wherein said at least one chain link defines a plurality of axes, and said at least one sensor component is adapted for detecting loading in relation to at least two of said plurality of axes.

20. The conveyor line assembly as set forth in claim 16, further comprising a controller, wherein said at least one sensor component includes a transceiver adapted for transmitting the signal correlative of the loading of said at least one chain link and further adapted for receiving command signals from said controller affecting the operation of said at least one sensor component.

* * * * *